US010157532B2

United States Patent
Jones et al.

(10) Patent No.: US 10,157,532 B2
(45) Date of Patent: Dec. 18, 2018

(54) DETECTION SYSTEM FOR UNSAFE ACTIVITY AT A SHELVING UNIT

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Aaron Vasgaard, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/850,797

(22) Filed: Dec. 21, 2017

(65) Prior Publication Data

US 2018/0174426 A1 Jun. 21, 2018

Related U.S. Application Data

(60) Provisional application No. 62/437,488, filed on Dec. 21, 2016.

(51) Int. Cl.
   G08B 21/22 (2006.01)
   G08B 21/04 (2006.01)

(52) U.S. Cl.
   CPC .......... *G08B 21/22* (2013.01); *G08B 21/0469* (2013.01)

(58) Field of Classification Search
   CPC .................................................... E04H 17/003
   See application file for complete search history.

(56) References Cited

U.S. PATENT DOCUMENTS

| 3,696,372 A | * | 10/1972 | Garrett | E06C 7/003 |
| | | | | 182/18 |
| 5,461,364 A | * | 10/1995 | Sanford, Jr. | G08B 13/122 |
| | | | | 256/11 |
| 5,670,778 A | | 9/1997 | Smith | |
| 7,772,986 B2 | | 8/2010 | Olson et al. | |
| 8,823,951 B2 | | 9/2014 | Mimeault et al. | |
| 2007/0067203 A1 | | 3/2007 | Gil et al. | |
| 2009/0008619 A1 | * | 1/2009 | Perry | E04H 17/00 |
| | | | | 256/59 |
| 2009/0021381 A1 | * | 1/2009 | Kondo | G08B 21/0275 |
| | | | | 340/573.1 |
| 2010/0033331 A1 | * | 2/2010 | Bautovich | A61B 5/1116 |
| | | | | 340/573.1 |
| 2012/0287266 A1 | * | 11/2012 | Varekamp | G06T 7/004 |
| | | | | 348/135 |

(Continued)

FOREIGN PATENT DOCUMENTS

WO      2009/138955 A2    11/2009

*Primary Examiner* — Laura Nguyen
(74) *Attorney, Agent, or Firm* — McCarter & English, LLP; David R. Burns (57) ABSTRACT

Methods, systems, and machine readable medium are provided for a detection system for identifying unsafe activity occurring at a shelving unit. A plurality of distance sensors are disposed at a top end of the shelving unit and point downwards towards a bottom end of the shelving unit. The plurality of sensors are configured to detect presence of a person near the shelving unit. An initial height of the person is determined, and a change in height of the person is detected. A processor determined whether the change in height indicates unsafe activity at the shelving unit. If unsafe activity is determined, then an alert is generated.

16 Claims, 6 Drawing Sheets

(56) References Cited

U.S. PATENT DOCUMENTS

| | | | |
|---|---|---|---|
| 2013/0117053 A2 | 5/2013 | Campbell | |
| 2015/0288877 A1* | 10/2015 | Glazer | H04N 5/2251 348/77 |
| 2015/0315809 A1* | 11/2015 | Catteeuw | E04H 17/161 256/24 |
| 2016/0086460 A1 | 3/2016 | King et al. | |
| 2016/0098911 A1* | 4/2016 | Murphy | G08B 21/0261 340/573.4 |
| 2016/0333632 A1* | 11/2016 | Grillberger | E06B 11/08 |
| 2017/0314328 A1* | 11/2017 | Friedman | E06C 7/003 |

* cited by examiner

DETECTION SYSTEM FOR UNSAFE ACTIVITY AT A SHELVING UNIT

RELATED APPLICATION

This application claims priority to U.S. Provisional Application No. 62/437,488 filed on Dec. 21, 2016, the content of which is hereby incorporated by reference in its entirety.

BACKGROUND

Shelving units aid in storing and displaying of various items. People may attempt to climb shelving units to gain access to items stored out of reach, e.g., on the highest shelf in the shelving unit, can be dangerous and unsafe.

SUMMARY

In one embodiment, a method for detecting unsafe activity at a shelving unit is provided. The method includes disposing multiple distance sensors at the shelving unit, where the distance sensors are disposed at the top end of the shelving unit and point downwards towards the bottom end of the shelving unit. The method further includes detecting presence of a person near the shelving unit via data sensed by the distance sensors, and determining an initial height of the person using at least one of the distance sensors. The method further includes detecting, via processor, a change in height of the person, where the change in height indicates an increase from the initial height, and determining whether the change in height indicates unsafe activity at the shelving unit. The method also includes generating, via the processor, an alert when the unsafe activity is determined.

In another embodiment, a detection system for identifying unsafe activity at a shelving unit is provided. The system includes multiple distance sensors disposed at the shelving unit, where the distance sensors are disposed at the top end of the shelving unit and point downwards towards the bottom end of the shelving unit. The distance sensors are configured to detect presence of a person near the shelving unit. The system also includes a server in communication with the distance sensors, where the server is configured to determine an initial height of the person using at least one of the distance sensors. The server is further configured to detect a change in height of the person, where the change in height indicates an increase from the initial height, and determine whether the change in height indicates unsafe activity at the shelving unit. The server is also configured to generate an alert when the unsafe activity is determined.

In yet another embodiment, a non-transitory computer readable medium is provided that stores instructions that when executed causes a processor to implement a method for detecting unsafe activity at a shelving unit. The method includes disposing multiple distance sensors at the shelving unit, where the distance sensors are disposed at the top end of the shelving unit and point downwards towards the bottom end of the shelving unit. The method further includes detecting presence of a person near the shelving unit via data sensed by the distance sensors, and determining an initial height of the person using at least one of the distance sensors. The method further includes detecting, via processor, a change in height of the person, where the change in height indicates an increase from the initial height, and determining whether the change in height indicates unsafe activity at the shelving unit. The method also includes generating, via the processor, an alert when the unsafe activity is determined.

BRIEF DESCRIPTION OF THE DRAWINGS

The accompanying figures, which are incorporated in and constitute a part of this specification, illustrate one or more embodiments of the present disclosure and, together with the description, help to explain the present disclosure. The embodiments are illustrated by way of example and should not be construed to limit the present disclosure. In the figures.

DETAILED DESCRIPTION

Shelving units are used to store and display various items. Often shelving units can have heights where the higher shelves are out of reach of people that may interact with the shelving units (for example some shelving units can be greater than seven, eight, nine, or ten feet in height). In some instances, the highest or top-most shelves may store extra items or extra stock to be accessed by employees when the stock on the lower shelves is depleted. These highest or top-most shelves are safely accessible using a ladder or staircase. Sometimes people may attempt climb or step on the shelves of the shelving unit to reach the highest or top-most shelves. Climbing a shelving unit can be dangerous and unsafe, and can cause injury if the shelving unit becomes unstable or if the person climbing the shelves loses his/her balance. Described herein is a detection system to determine when unsafe activity occurs at a shelving unit, and to generate an alert or notification in response to determining that unsafe activity is occurring.

Systems, methods and computer readable medium are described herein for a detection system for detecting unsafe activity at a shelving unit. Exemplary embodiments include one or more sensors disposed at a shelving unit. Using the data sensed by the sensors, the detection system can detect a presence of a person at the shelving unit, and determine an initial height of the person. The detection system determines if there is a change in height of the person, and determines whether the change in height indicates unsafe activity (for example climbing activity) at the shelving unit. If unsafe activity is identified, then an alert is generated. The alert may be an audible warning to the person at the shelving unit, or it may be a message transmitted to a user proximate to the shelving unit so that the user can approach the person at the shelving unit.

Figure 1:
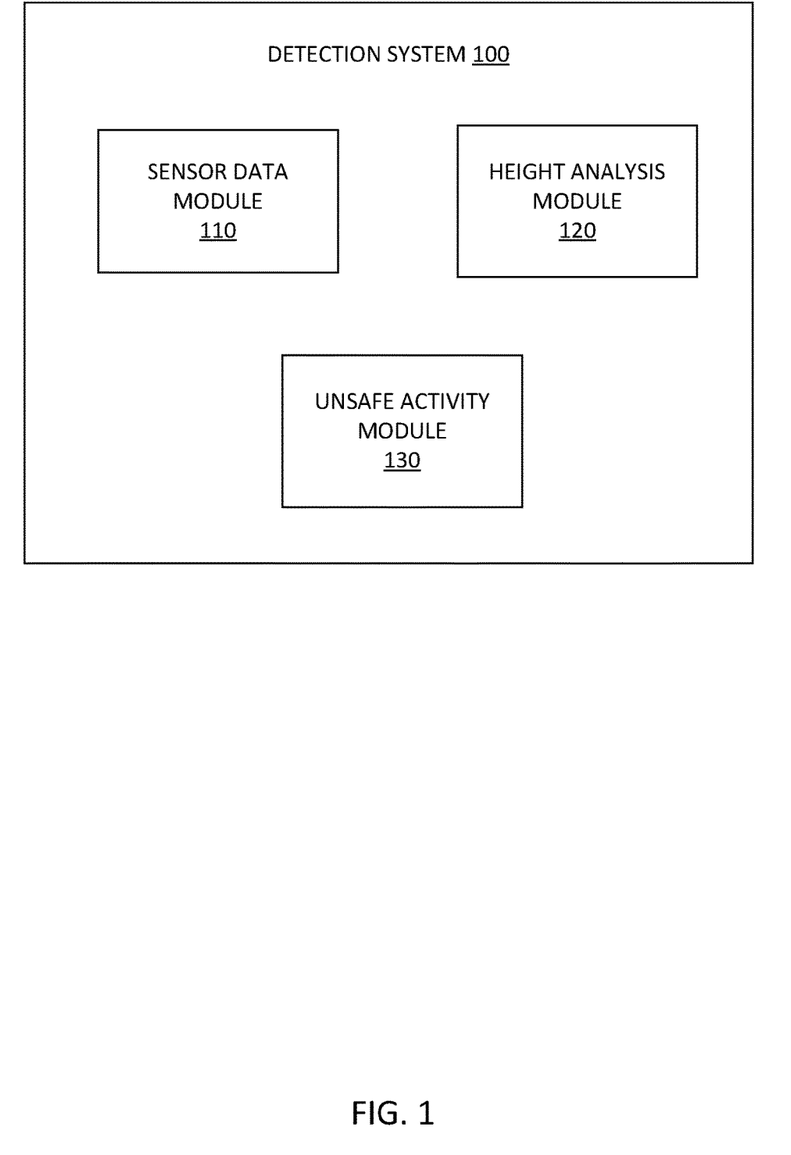
FIG. 1 is a block diagram showing an exemplary detection system for detecting unsafe activity at a shelving unit, according to an example embodiment.

FIG. 1 is a block diagram showing a detection system 100 in terms of modules for detecting unsafe activity at a shelving unit, according to an example embodiment. One or more of the modules may be implemented in server 530 shown in FIG. 5. In alternative embodiments, one or more of the modules may be implemented in device 520, 525 shown in FIG. 5. The modules can include a sensor data module 110, a height analysis module 120, and an unsafe activity module 130. The modules may include various circuits, circuitry and one or more software components, programs, applications, or other units of code base or instructions configured to be executed by one or more processors (e.g., included in the devices 520, 525 and/or the server 530 shown in FIG. 5). Although modules 110, 120, 130 are shown as distinct modules in FIG. 1, it should be understood that modules 110, 120, and 130 may be implemented as fewer or more modules than illustrated. It should be understood that in some embodiments any of modules 110, 120, and 130 may communicate with one or more components included in exemplary embodiments (e.g., sensors 510, device 520, device 525, server 530, or database(s) 540 of system 500 shown in FIG. 5).

The sensor data module 110 can be configured to receive and manage data acquired or sensed by sensors (e.g., sensors 315 or 415) disposed at the shelving unit, and can maintain and control the sensors. The sensors can be configured to detect a presence of a person near the shelving unit and at least an initial height of the person (e.g., measured from the floor to a sensed highest point of the person). In one embodiment, the sensors are disposed at a top end of the shelving unit pointing downwards towards the bottom end of the shelving unit. In another embodiment, the sensors are disposed at a bottom corner of the shelving unit, and pointing towards a diagonally located top corner of the shelving unit. In this embodiment, the sensors may rotate or emit a beam or field of energy while rotating to sense presence of a person and the person's height. In example embodiments, the sensor data module 110 stores the sensed data in a database. In an example embodiment, the location of the sensors disposed at the shelving unit is stored in a database.

In example embodiments, the sensors are distance sensors. The sensors may include, but are not limited to, laser sensors, laser ruler sensors, laser rangefinder sensors, infrared sensors, acoustic sensors, proximity sensors, capacitive or photoelectric sensors, inductive sensors, optical sensors, sonar sensors, thermal infrared sensors, ultrasonic sensors, radar sensors, hall effect sensors, and the like. In other embodiments, the sensors may be motion detector sensors, including but not limited to, passive infrared sensors, microwave radiation sensors, ultrasonic sensors, tomographic motion detector sensors, thermal sensors, and the like. In some embodiments, the sensors emit a beam or field of energy or light, and sense the return signal that is reflected off of objects in the path of the beam or field. In other embodiments, the sensors may include an image capturing device and may use video analytics to detect a person near the shelving unit and sense the height of the person.

The height analysis module 120 may be configured to analyze the data sensed by the sensors and collected by the sensor data module 110. The height analysis module 120 determines an initial height of a person near the shelving unit (e.g., as measured between the floor and the highest recognized point of the person—such as the top of the person's head). The height analysis module 120 may also determine a change in height of the person if the sensor data module 110 detects a different height for the person within a given period of time (e.g., a change in the distance between the floor and the highest point of the person—such as the top of the person's head). The height analysis module 120 may store the change of height data, including the initial height and a current height for the person, in a database. The height of the person may generally be measured from the top of the person's head. The height of a person may be determined based on an interruption in the beam or field of energy emitted by the distance sensor, and at the physical point where the interruption occurs.

The unsafe activity module 130 may be configured to analyze the change of height data, initial height data, and current height data stored by the height analysis module 120. As the person interacts with the shelving unit, the unsafe activity module 130 analyzes the height data to determine whether unsafe activity is occurring at the shelving unit. In example embodiments, the unsafe activity module 130 analyzes the height data and determines that the change in height of the person indicates that the person is climbing the shelving unit. In other embodiments, the unsafe activity module 130 analyzes the data and determines that the change in height of the person does not indicate that the person is climbing the shelving unit, rather the person may initially be sitting or crouching and later stood up. The unsafe activity module 130 is configured to distinguish between, based on the change in height and the initial height, when a person is climbing the shelving unit versus when the person transitions to a upright standing position from a bending, sitting or crouching position, and/or when a person is simply raising his/her arms to reach for an item stored on a shelf (as opposed to the person climbing the shelf). In an example embodiment, the unsafe activity module 130 may use the height or position of the first or lowest shelf on the shelving unit that a person is capable of stepping on or climbing on to determine if a person is climbing the shelving unit.

The unsafe activity module 130 may also be configured to generate an alert when unsafe activity at a shelving unit is detected. The alert may be transmitted to a speaker in the form of an electrical signal to provide an audible alert to the person or persons near the shelving unit, or the alert may be transmitted to a user device in the form of a message to provide an alert to user near the shelving unit.

Figure 2:
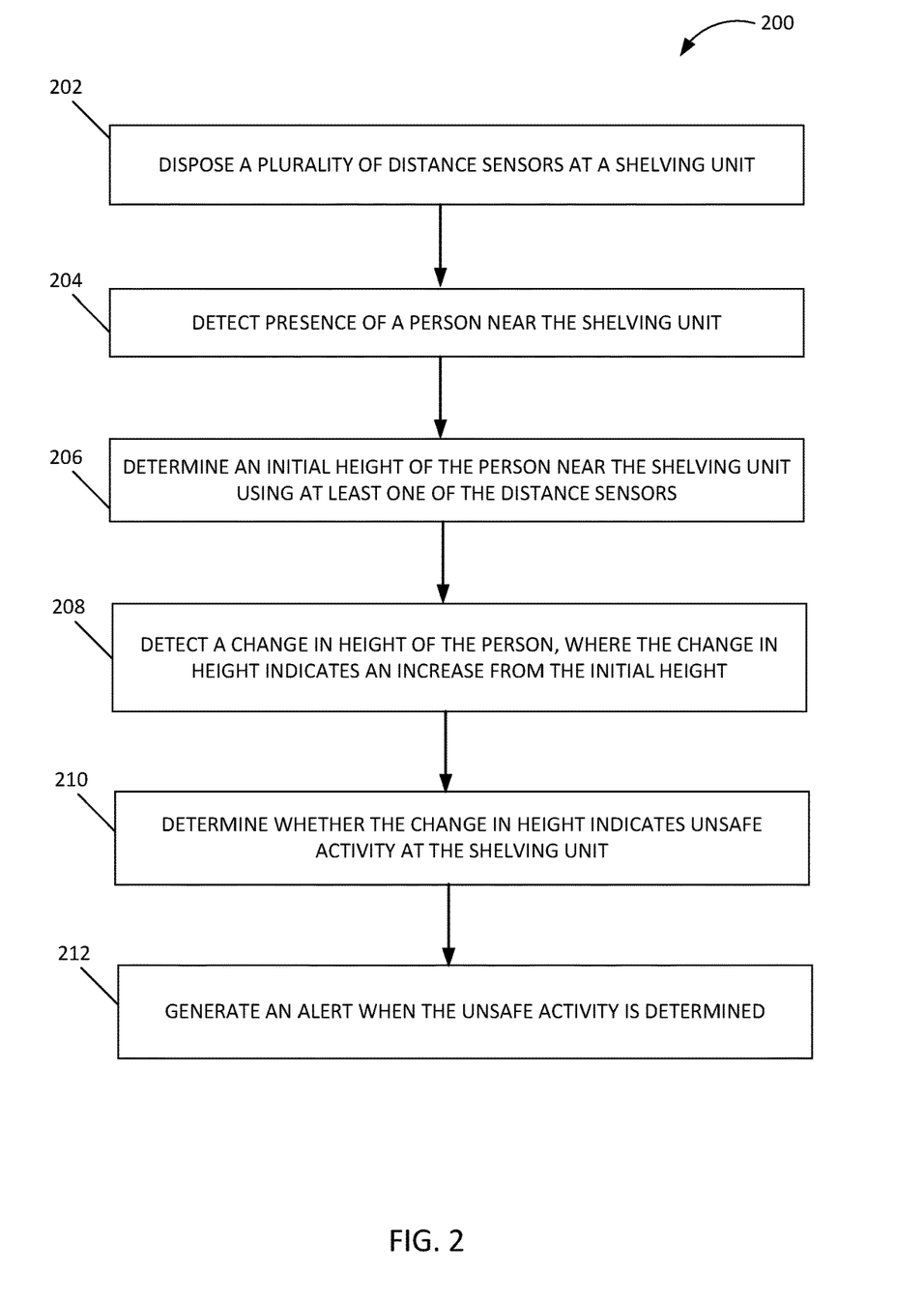
FIG. 2 is a flowchart illustrating an exemplary method for detecting unsafe activity at a shelving unit, according to an example embodiment.

FIG. 2 is a flowchart illustrating an exemplary method 200 for detecting unsafe activity at a shelving unit, according to an example embodiment. The method 200 may be performed using one or more modules of the detection system 100 described above.

Figure 3A:
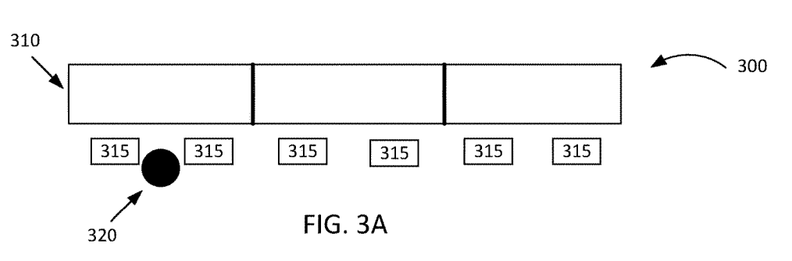
FIGS. 3A, 3B, and 3C are perspective views of an exemplary shelving unit and multiple distance sensors, according to an example embodiment.
Figure 3B:
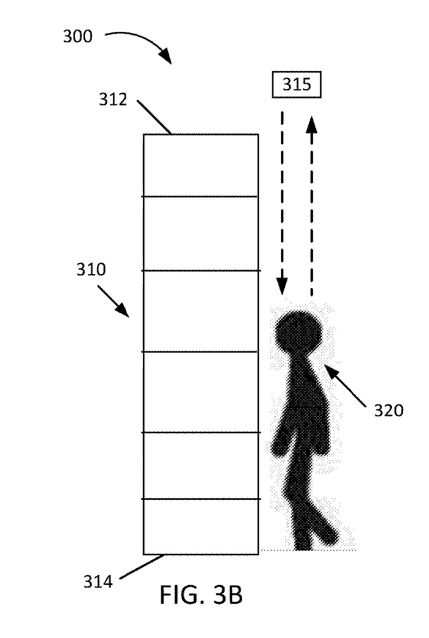
Figure 3C:
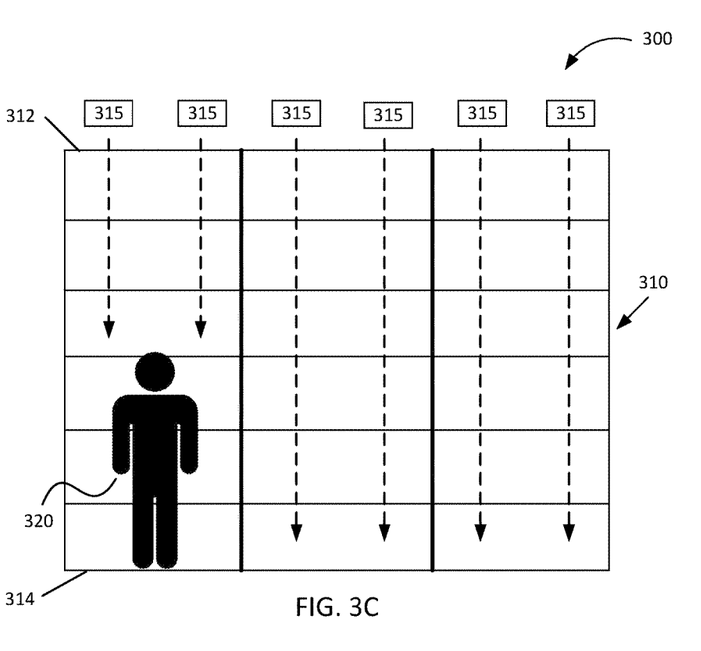

At step 202, a plurality of distance sensors are disposed at a shelving unit. The distance sensors may be disposed at a top end of the shelving unit, and may be positioned to point downwards towards a bottom end of the shelving unit (for example, as illustrated in FIGS. 3A, 3B and 3C). The distance sensors may be disposed at the top end of the shelving unit as needed to be able to detect a height of a person at the shelving unit. The distance sensors may be coupled to the top end of the shelving unit. In other embodiments, the distance sensors may extend outwardly from the top end of the shelving unit.

Figure 4A:
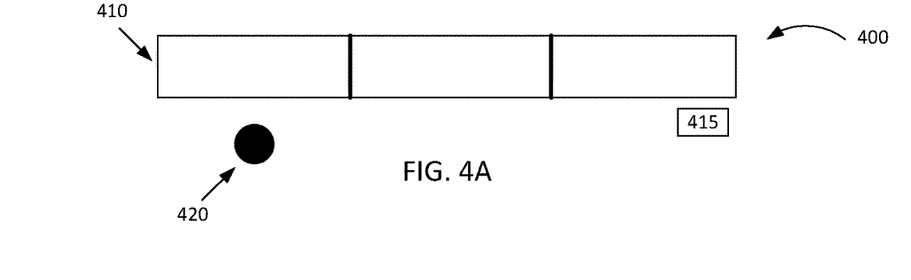
FIGS. 4A, 4B, and 4C are perspective views of an exemplary shelving unit and a distance sensor, according to an example embodiment.
Figure 4B:
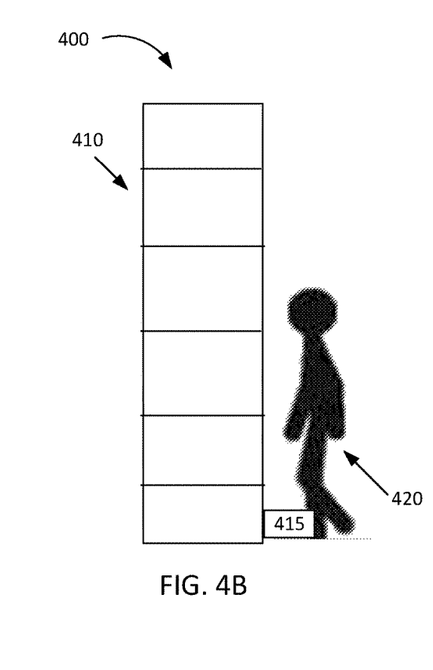
Figure 4C:
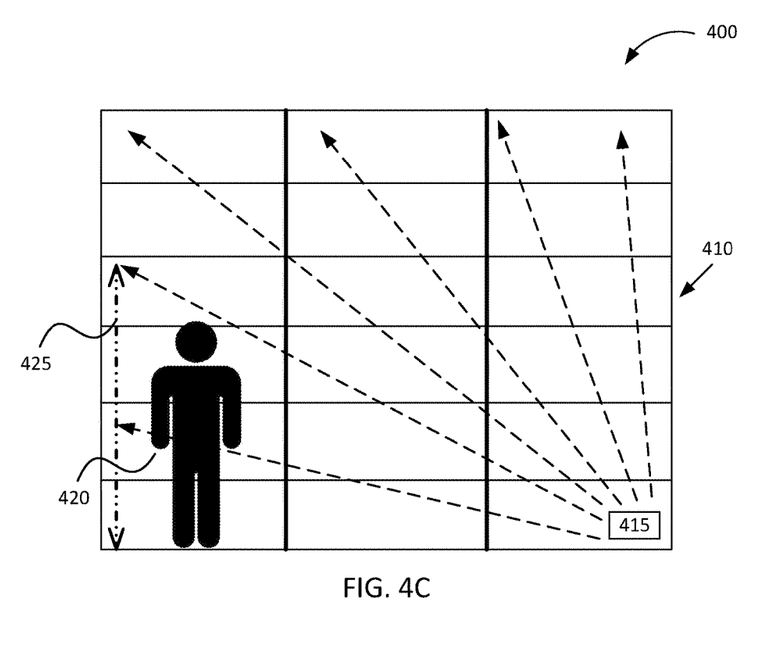

In another embodiment, a distance sensor may be disposed at a bottom corner of the shelving unit. and may be positioned to point towards a diagonally located top corner of the shelving unit (for example, as illustrated in FIGS. 4A, 4B, and 4C). The distance sensor may emit a beam or field of energy while rotating to detect a person near the shelving unit.

At step 204, the sensor data module 110 detects presence of a person near the shelving unit. The sensor data module 110 may detect presence of a person as he or she approaches the shelving unit or is within a predefined distance from the shelving unit. Once a person is detected near the shelving unit, the detection system 100 may actively perform the next steps of method 200.

At step 206, the height analysis module 120 determines an initial height of the person near the shelving unit using at least one of the distance sensors. The initial height of the person may be determined substantially at the same time step 204 where the presence of a person is detected. In most cases, the initial height of the person is the height when the person is in an upright standing position. In other cases, the initial height of the person may be the height when the person is in a sitting, bending, or crouching position. The initial height of the person may be stored in a database and transmitted to a server. As one non-limiting example, the distance sensor can be disposed at a known height above the shelving unit such that the distance between distance sensors and the floor is known by the system. In this example, the distance measured by the distances sensors can be the distance from the distance sensors to, e.g., a top of the person's head. The system can determine the initial height of the person as the difference between the height of the distance sensors and the measured distance between the distance sensors and the top of the person's head.

At step 208, the height analysis module 120 detects a change in height of the person where the change in height indicates an increase from the initial height. In some cases, the person's height may change when he or she transitions from an upright standing position to climbing on the shelving unit. In this case, the height analysis module 120 determines that the change in height is an increase from the initial height.

In other cases, the person's height may change when he or she transitions from an upright standing position to a sitting, bending or crouching position. The person may sit or crouch to access the lowest shelf at the shelving unit. In this case, the height analysis module 120 determines that the change in height is a decrease from the initial height. In some embodiments, if the change in height indicates a decrease from the initial height, then the unsafe activity module 130 may automatically determine that no unsafe activity is occurring.

In other cases, the person's height may change when he or she transitions from a sitting, bending, or crouching position to an upright standing position. In this case, the height analysis module 120 determines that the change in height is an increase from the initial height, and the unsafe activity module 130 determines whether the change in height indicates unsafe activity at the shelving unit.

The height analysis module 120 may determine a current height of the person that is different than the initial height. The current height may be stored in a database and transmitted to a server. The height analysis module 120 may monitor the height of the person at the shelving unit over a period of time, and store the height of the person over the period of time for use by the unsafe activity module 130. The height analysis module 120 may also update the initial height of the person after a predefined period of time.

At step 210, the unsafe activity module 130 determines whether the change in height indicates unsafe activity at the shelving unit. In an example embodiment, determining whether the change in height indicates unsafe activity is based on the initial height and the change in the height. The unsafe activity module 130 is configured to distinguish between a change in height caused by a person initially sitting, bending or crouching and then transitioning to an upright standing position, versus a change in height caused by a person climbing the shelving unit.

The unsafe activity module 130 may take into account the initial height recorded by the height analysis module 120 for the person. For example, if the initial height of the person is within a low range (for example, approximately 2-4 feet), then the increase in height may be analyzed by the unsafe activity module 130 to indicate that a person transitioned from a sitting, bending or crouching position to a upright standing position. In this case, the unsafe activity module 130 determines that unsafe activity is not occurring at the shelving unit.

As another example, if the initial height of the person is within a high range (for example, between approximately 5 to 6 feet), then the increase in height may be analyzed by the unsafe activity module 130 to indicate that a person is climbing the shelving unit.

In some embodiments, the unsafe activity module 130 may use the height or position of the first or lowest shelf at the shelving unit that a person is capable of stepping on or climbing. The unsafe activity module 130 may determine a person is climbing the shelf when the increase in height of the person is substantially equal to the height of the first or lowest shelf. In some embodiments, the unsafe activity module 130 may use the height or position of the second lowest shelf at the shelving unit to determine if a person is climbing the shelving unit.

In some embodiments, the unsafe activity module 130 uses the distance between the shelves at the shelving unit to determine if a person is climbing the shelving unit. For example, the unsafe activity module 130 may compare the change in height with the distance between the shelves, since that indicates that the person stepped on or climbed at least one shelf of the shelving unit. This method can be useful in detecting unsafe activity by persons at the shelving unit who is a child or is of a less than average height.

At step 212, the unsafe activity module 130 generates an alert when the unsafe activity is determined. The alert may be a message transmitted to a user device. The alert may be an audible warning to the person at the shelving unit.

In an example embodiment, in response to generating an alert, the unsafe activity module 130 transmits an electrical signal to a speaker to cause the speaker to generate an audible warning to the person. The speaker may be located near the shelving unit where the unsafe activity is taking place. In an example embodiment, the audible warning may be a beeping sound or may be a warning such as "do not climb shelving unit." In an example embodiment, the audible warning may vary based on how many shelves the person has climbed at the shelving unit. For example, if the detection system 100 determines that the person has stepped on the first or lowest shelf, then the audible warning may be of a lower intensity. If the detection system 100 determines that the person has stepped on the second or third shelf from the bottom end of the shelving unit, the audible warning may be of a higher intensity.

In an example embodiment, the method 200 also includes transmitting the alert to a user device associated with a user. In some embodiments, the alert is transmitted to the user device based on proximity of the user device to the unsafe activity.

In an example embodiment, the unsafe activity module 130 determines the location of the unsafe activity using the distance sensors, and determines one or more user devices proximate to the location of the unsafe activity to transmit the alert to the proximate user devices. The location of the sensors may be stored in a database, and the unsafe activity module 130 may retrieve the location of the unsafe activity based on this data. The location of the user devices may be determined based on a GPS or location sensors included in the user device. Once a proximate user device is alerted or notified, the corresponding user is able to approach the shelving unit where unsafe activity is occurring to warn the person at the shelving unit.

The unsafe activity relates to the person climbing the shelving unit and causing the shelving unit to become unstable and causing injuring to one or more persons near the shelving unit. In one embodiment, the shelving unit has a height that is greater than the average human height, e.g., greater than approximately six feet five inches, measured between the bottom end and the top end. In an example embodiment, the shelving unit has a height of approximately seven to twelve feet measured between the bottom end and the top end. In other embodiments, the shelving unit has a height greater than twelve feet.

In an example embodiment, the distance sensors are placed at a particular distance apart, such that the detection system 100 can distinguish between a person's head and a person's hand based on the width perceived by the sensors. This enables the detection system 100 to determine if a person is reaching for an item at the shelving unit, or if he or she is climbing the shelving unit. Often a person first attempts to reach the item with his or her hand, and then climbs the shelving unit if it is out of his or her hand's reach. For example, the detection system 100, at a particular height of the shelving unit, senses a person climbing based on first sensing a smaller width for a person's hand moving closer to the sensors, then sensing a larger width of the person's head moving closer to the sensors. Subsequently, the detection system 100 senses a much larger width for the person's shoulders moving closer to the sensors. This sequence of sensed widths may indicate to the detection system 100 that a person is climbing the shelving unit. In this manner, the detection system 100 can detect a person climbing the shelving unit.

In another embodiment, the detection system 100 retrieves the height of the shelving unit, and generates and transmits an alert when activity is detected at the topmost shelf or height of the shelving unit.

In some cases, an associate is tasked to access the topmost shelf or height of the shelving unit. The associate may climb the shelving unit safely or use a ladder or step stool to access the top of the shelving unit. The detection system 100 is configured to eliminate false alerts under such circumstances. For example, the associate carries a device (e.g., computing device, portable device, etc.) that includes a positioning system and transmits a position or location of the associate to a server. Using the location or position of the associate, the detection system 100 determines that the unsafe activity is detected at the location or position of the associate, and therefore is a false alert. In this case, the detection system 100 does not transmit the alert. In an example embodiment, the detection system 100 may transmit a message to the server regarding the false alert for record keeping purposes.

FIGS. 3A, 3B, and 3C are perspective views of an exemplary shelving unit and a plurality of distance sensors, according to an example embodiment. FIG. 3A is a top view of an exemplary system 300 including a shelving unit 310 and a plurality of distance sensors 315. FIG. 3B is a side view of an exemplary system 300 including a shelving unit 310 and a plurality of distance sensors 315. FIG. 3C is a front view of an exemplary system 300 including a shelving unit 310 and a plurality of distance sensors 315. As shown in FIGS. 3B and 3C, the distance sensors 315 are disposed at a top end 312 of the shelving unit 310. The distance sensors 315 are disposed so that they point downwardly toward the bottom end 314 of the shelving unit 310. The distance sensors 315 may be positioned approximately four feet apart. The person 320 is shown in an upright standing position.

FIGS. 4A, 4B, and 4C are perspective views of an exemplary shelving unit and a distance sensor, according to an example embodiment. FIG. 4A is a top view of an exemplary system 400 including a shelving unit 410 and a distance sensor 415. FIG. 4B is a side view of an exemplary system 400 including a shelving unit 410 and a distance sensor 415. FIG. 4C is a front view of an exemplary system 400 including a shelving unit 410 and a distance sensor 415. As shown in the figures, the distance sensor 415 is disposed at a bottom corner of the shelving unit pointing upward. Alternatively, or in addition, the distance sensor 415 may be disposed at a top corner of the shelving unit 410 pointing downward. The sensor 415 emits a beam or field of energy or light across the shelving unit 410 to sense a height of a person. In an example embodiment, the sensor 415 may rotate to emit a beam or field of energy across the shelving unit 410.

In the embodiment where the distance sensor is disposed in the bottom corner of the shelving unit, the height analysis module 120 determines the initial height of the person based on interruption in the beam or field of energy emitted by the distance sensor while rotating. The distance between the floor and the point where the interruption occurs can be used to determine the initial height and current height of the person near the shelving unit.

In this manner, the detection system described herein can be used to detect unsafe activity at a shelving unit that may occur when a person climbs the shelving unit to reach the top shelves. Unsafe activity is detected via the sensors disposed at the shelving unit. When any unsafe activity is detected, an alert is generated to notify the person at the shelving unit or to notify a user proximate to the shelving unit.

Figure 5:
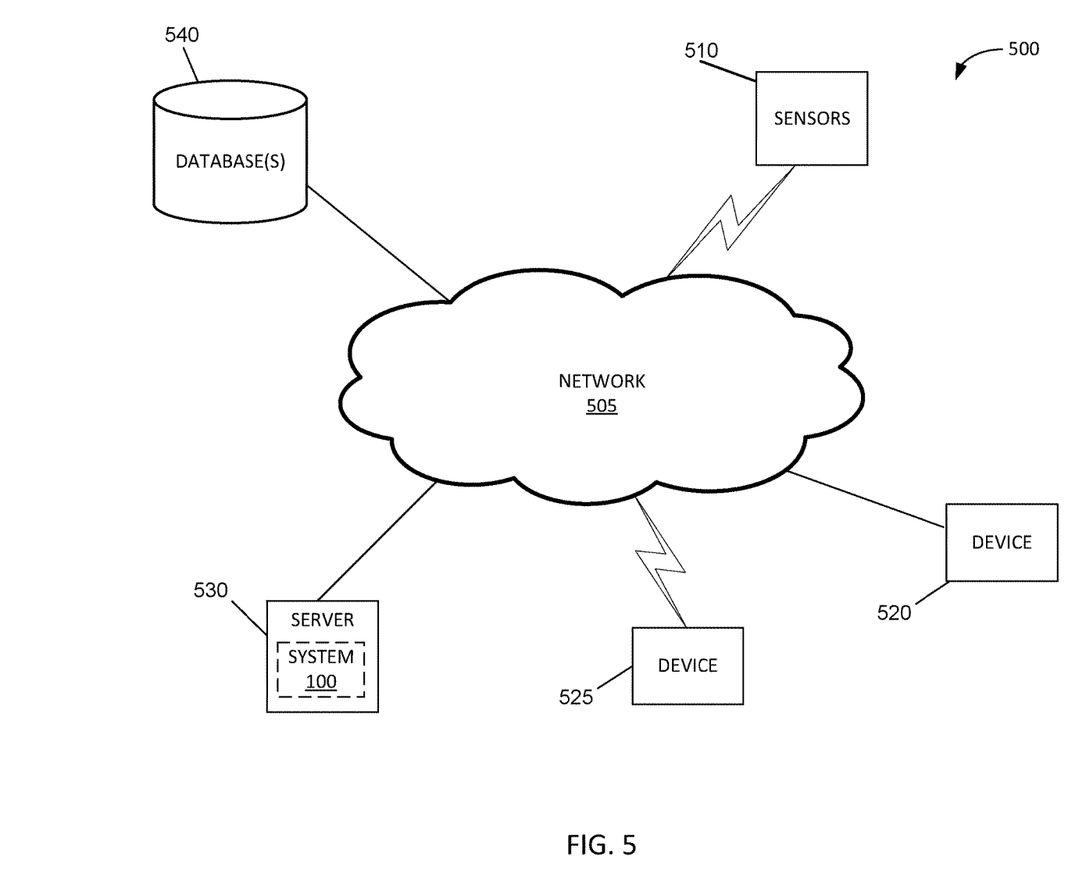
FIG. 5 is a diagram of an exemplary network environment suitable for a distributed implementation of exemplary embodiments.

FIG. 5 illustrates a network diagram depicting a system 500 for implementing the detection system 100, according to an example embodiment. The system 500 can include a network 505, sensors 510, device 520, device 525, server 530, and database(s) 540. Each of sensors 510, device 520, device 525, server 530, and databases 540 is in communication with the network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The sensors 510 may include, but are not limited to distance sensors, laser sensors, laser ruler sensors, laser rangefinder sensors, infrared sensors, acoustic sensors, proximity sensors, capacitive or photoelectric sensors, inductive sensors, optical sensors, sonar sensors, thermal infrared sensors, ultrasonic sensors, radar sensors, hall effect sensors, and the like. The sensors 510 may also include motion detector sensors, including but not limited to, passive infrared sensors, microwave radiation sensors, ultrasonic sensors, tomographic motion detector sensors, thermal sensors, and the like. In other embodiments, the sensors 510 may include an image capturing device and may use video analytics to detect a person near the shelving unit and sense the height of the person.

The device 520, 525 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The device 520, 525 can include one or more components described in relation to computing device 600 shown in FIG. 6. The device 520, 525 may connect to network 505 via a wired or wireless connection. The device 520, 525 may be a hand-held device or a mobile device used by a user proximate to a shelving unit where unsafe activity is detected.

Each of the database(s) 540 and server 530 is connected to the network 505 via a wired connection. Alternatively, one or more of the database(s) 540, and server 530 may be connected to the network 505 via a wireless connection. Server 530 may include one or more computers or processors configured to communicate with sensors 510 and/or devices 520 and 525 via network 505. Server 530 hosts one or more applications accessed by device 520 and device 525, and/or facilitates access to the content of databases 540. Server 530 may also include one or more modules of the detection system 100. Database(s) 540 include one or more storage devices for storing data and/or instructions (or code) for use by server 530, and/or device 520, 525. Database(s) 540 and server 530 may be located at one or more geographically distributed locations from each other or from device 520, 525. Alternatively, database(s) 540 may be included within server 530.

The database(s) 540 may store data sensed by the sensors 510, location data of the sensors 510, height data of persons determined by the detection system 100, and other information used by the detection system to identify unsafe activity at a shelving unit.

Figure 6:
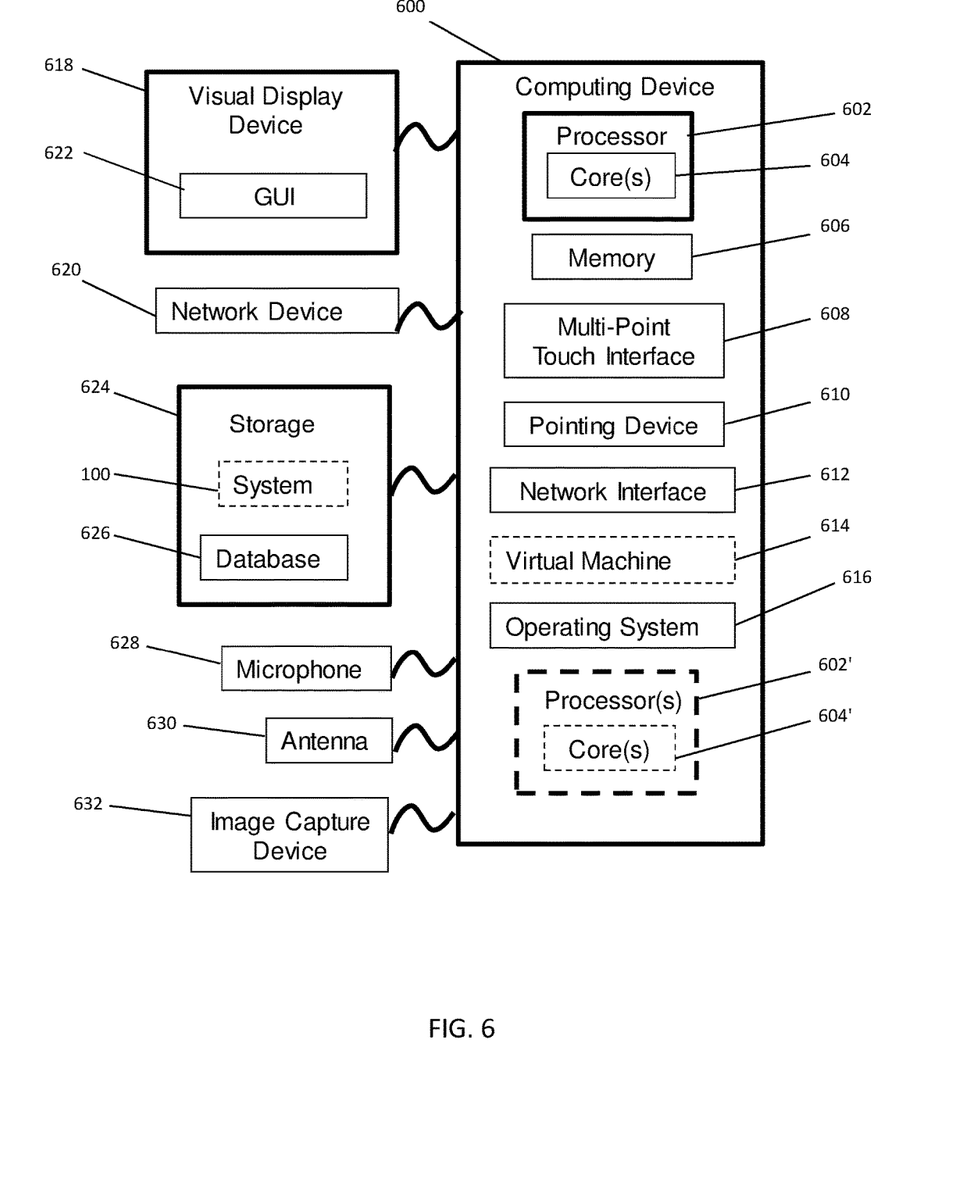
FIG. 6 is a block diagram of an exemplary computing device that may be used to implement exemplary embodiments described herein.

FIG. 6 is a block diagram of an exemplary computing device 600 that can be used to perform the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof.

A user can interact with the computing device 600 through a visual display device 618, such as a touch screen display or computer monitor, which can display one or more user interfaces 619 that can be provided in accordance with exemplary embodiments. The visual display device 618 can also display other aspects, elements and/or information or data associated with exemplary embodiments. The computing device 600 can include other I/O devices for receiving input from a user, for example, a keyboard or another suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software, such as the system 100 that implements exemplary embodiments of the detection system described herein, or portions thereof, which can be executed to generate user interface 619 on display 618. Exemplary storage device 624 can also store one or more databases for storing suitable information required to implement exemplary embodiments. The databases can be updated by a user or automatically at a suitable time to add, delete or update one or more items in the databases. Exemplary storage device 624 can store one or more databases 626 for storing data measured by the sensors, location of the sensors, height determined for persons, alerts generated by the system, and other data/information used to implement exemplary embodiments of the systems and methods described herein.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of the above. The network interface 612 can include a built-in network adapter, network interface card, PCMCIA network card, card bus network adapter, wireless network adapter, USB network adapter, modem or another device suitable for interfacing the computing device 600 to a type of network capable of communication and performing the operations described herein. Moreover, the computing device 600 can be a computer system, such as a workstation, desktop computer, server, laptop, handheld computer, tablet computer (e.g., the iPad® tablet computer), mobile computing or communication device (e.g., the iPhone® communication device, a computing device employing the Android™ operating system), or other form of computing or telecommunications device that is capable of communication and that has sufficient processor power and memory capacity to perform the operations described herein.

The computing device 600 can run operating systems 616, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or another operating system capable of running on the computing device and performing the operations described herein. In exemplary embodiments, the operating system 616 can be run in native mode or emulated mode. In an exemplary embodiment, the operating system 616 can be run on one or more cloud machine instances.

The following description is presented to enable a person skilled in the art to create and use a computer system configuration and related method and systems for detection of unsafe activity at a shelving unit. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that the embodiments may be practiced without the use of these specific details. In other instances, well-known structures and processes are shown in block diagram form in order not to obscure the description of embodiments with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A method for alerting a user of unsafe activity at a shelving unit, the method comprising:
    disposing a plurality of distance sensors at the shelving unit, the shelving unit having a top end and a bottom end, the plurality of distance sensors disposed at and along the top end of the shelving unit and pointing downwards towards the bottom end of the shelving unit;
    detecting presence of a person near the shelving unit via data sensed by one or more of the plurality of distance sensors;
    determining an initial height of the person relative to a floor using at least one of the plurality of distance sensors;
    detecting, via a processor, a change in height of the person relative to the floor, wherein the change in height indicates an increase from the initial height;
    determining, via the processor, whether the change in height indicates unsafe activity at the shelving unit;
    generating, via the processor, an alert when the unsafe activity is determined;
    determining a location of the unsafe activity within a facility using at least one of the plurality of distance sensors;
    determining one or more users proximate to the location of the unsafe activity; and
    transmitting the alert to one or more user devices associated with the one or more users.

2. The method of claim 1, wherein the determining whether the change in height indicates unsafe activity is based on the initial height and the change in the height.

3. The method of claim 1, further comprising:
    transmitting the alert to the user device based on proximity of the user device to the unsafe activity.

4. The method of claim 1, further comprising:
    in response to generating an alert, transmitting an electrical signal to a speaker to cause the speaker to generate an audible warning to the person.

5. The method of claim 1, wherein the unsafe activity relates to the person climbing the shelving unit.

6. The method of claim 1, wherein the shelving unit has a height that is greater than six feet five inches measured between the bottom end and the top end.

7. The method of claim 1, wherein the shelving unit has a height of at least seven feet measured between the bottom end and the top end.

8. A detection system for alerting a user of unsafe activity at a shelving unit, the system comprising:
    a plurality of distance sensors disposed at the shelving unit, the shelving unit having a top end and a bottom end, the plurality of distance sensors disposed at and along the top end of the shelving unit and pointing downwards towards the bottom end of the shelving unit;
    wherein one or more of the plurality of distance sensors are configured to detect presence of a person near the shelving unit;
    a server in communication with the plurality of distance sensors, wherein the server is configured to:
        determine an initial height of the person relative to a floor using at least one of the plurality of distance sensors;
        detect a change in height of the person relative to the floor, wherein the change in height indicates an increase from the initial height;
        determine whether the change in height indicates unsafe activity at the shelving unit;
        generate an alert when the unsafe activity is determined;
        determine location of the unsafe activity within a facility using the plurality of distance sensors;
        determine one or more users proximate to the location of the unsafe activity; and
        transmit the alert to one or more user devices associated with the one or more users.

9. The system of claim 8, wherein the server determines whether the change in height indicates unsafe activity based on the initial height and the change in the height.

10. The system of claim 8, wherein the server is further configured to transmit the alert to the user device based on proximity of the user device to the unsafe activity.

11. The system of claim 8, wherein the server is further configured to transmit an electrical signal to a speaker to cause the speaker to generate an audible warning to the person in response to generating the alert.

12. The system of claim 8, wherein the unsafe activity relates to the person climbing the shelving unit.

13. The system of claim 8, wherein the shelving unit is at least seven feet tall.

14. A non-transitory computer readable medium storing instructions that causes a processor to implement a method for alerting a user of unsafe activity at a shelving unit, the method comprising:
  receiving data sensed by a plurality of distance sensors at the shelving unit, the shelving unit having a top end and a bottom end, the plurality of distance sensors disposed at and along the top end of the shelving unit and pointing downwards towards the bottom end of the shelving unit;
  detecting presence of a person near the shelving unit via the data sensed by one or more of the plurality of distance sensors;
  determining an initial height of the person relative to a floor using at least one of the plurality of distance sensors;
  detecting a change in height of the person relative to the floor, wherein the change in height indicates an increase from the initial height;
  determining whether the change in height indicates unsafe activity at the shelving unit;
  generating an alert when the unsafe activity is determined;
  determining location of the unsafe activity within a facility using the plurality of distance sensors;
  determining one or more users proximate to the location of the unsafe activity; and
  transmitting the alert to one or more user devices associated with the one or more users.

15. The non-transitory computer readable medium of claim 14, wherein the method further comprises transmitting the alert to the user device based on proximity of the user device to the unsafe activity.

16. The non-transitory computer readable medium of claim 14, wherein the method further comprises in response to generating an alert, transmitting an electrical signal to a speaker to cause the speaker to generate an audible warning to the person.

* * * * *